United States Patent [19]
Taylor

[11] Patent Number: 6,118,461
[45] Date of Patent: Sep. 12, 2000

[54] CIRCUITS, SYSTEMS AND METHODS FOR MEMORY MAPPING AND DISPLAY CONTROL SYSTEMS USING THE SAME

[75] Inventor: Ronald T. Taylor, Grapevine, Tex.

[73] Assignee: Cirrus Logic, Inc.

[21] Appl. No.: 09/066,618

[22] Filed: Apr. 24, 1998

Related U.S. Application Data

[62] Division of application No. 08/534,279, Sep. 27, 1995, Pat. No. 6,025,840.

[51] Int. Cl.[7] ............................... G06F 13/14; G09G 5/36
[52] U.S. Cl. ......................... 345/520; 345/515; 711/202; 711/217
[58] Field of Search ................................... 345/501–503, 345/520, 521, 507, 509, 515, 516, 1, 4; 710/8–10, 12; 711/202, 209, 217, 218

[56] References Cited

U.S. PATENT DOCUMENTS

| | | | |
|---|---|---|---|
| 5,473,573 | 12/1995 | Rao | 345/188 |
| 5,745,786 | 4/1998 | Juall | 710/9 |
| 5,748,982 | 5/1998 | Smith et al. | 710/9 |
| 5,778,196 | 7/1998 | Chen | 710/104 |
| 5,797,036 | 8/1998 | Kikinis | 710/38 |
| 5,928,343 | 7/1999 | Farmwald et al. | 710/104 |
| 5,956,522 | 9/1999 | Bertone et al. | 710/52 |

*Primary Examiner*—Ulka J. Chauhan
*Attorney, Agent, or Firm*—Peter Rutkowski, Esq.; James J. Murphy, Esq.; Winstead Sechrest & Minick

[57] ABSTRACT

A processing system 100 is disclosed which includes a system master 101, a system bus 102 coupled to the master, and a plurality of bus interface circuits 106 coupled to bus 102. A first one of the bus interfaces 106 includes a mapping signal input coupled to the master and a mapping signal output, the first bus interface 106 operable to latch-in at least one first selected address bit presented by the master on the system bus in response to a mapping enable signal received at the mapping signal input from the master 101. A second bus interface 106 is provided coupled to the bus 102 and having a mapping signal input coupled to the mapping signal output of first bus interface 106, the second bus interface 106 operable to latch-in at least one second selected address bit presented by the master 101 on the bus 102 in response to a second mapping enable signal received at the mapping input of the second bus interface 106 from the first bus interface 106.

15 Claims, 2 Drawing Sheets

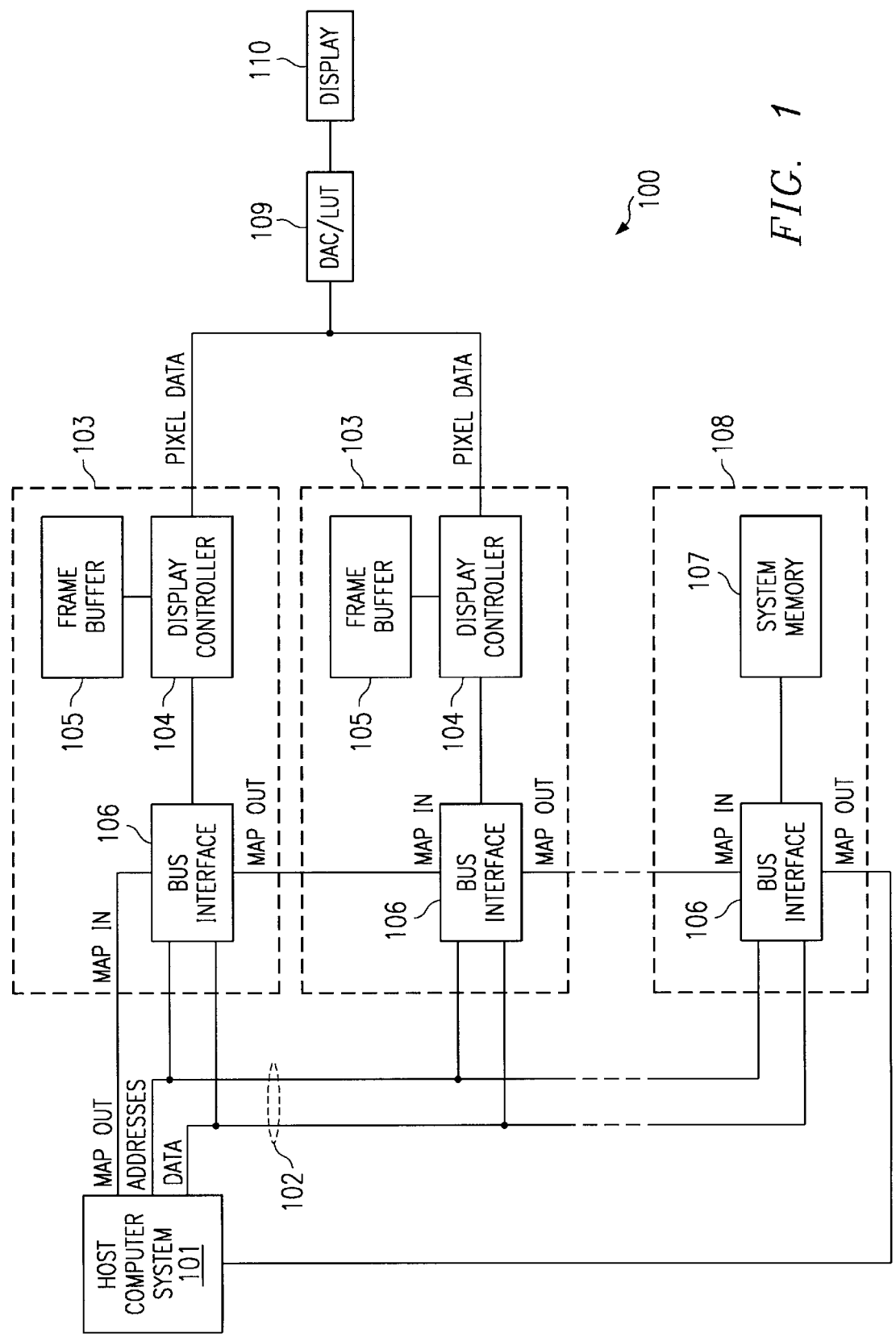

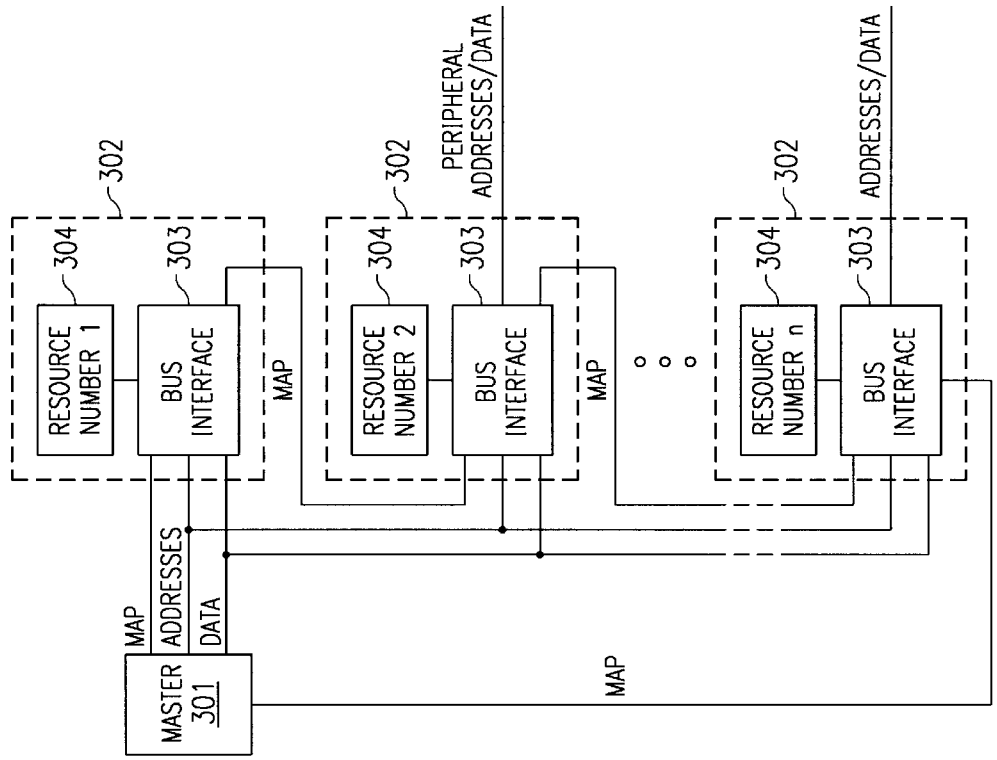
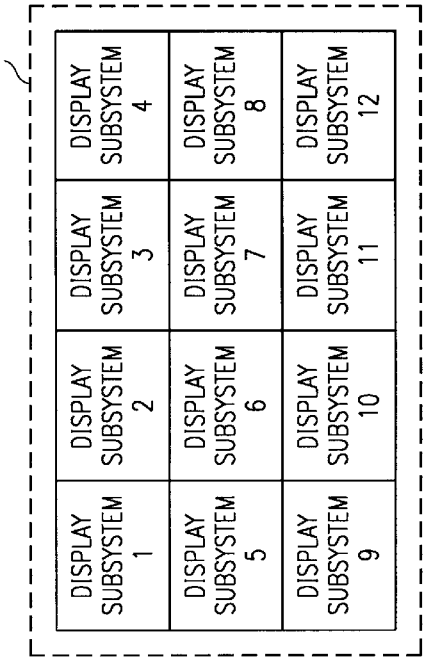
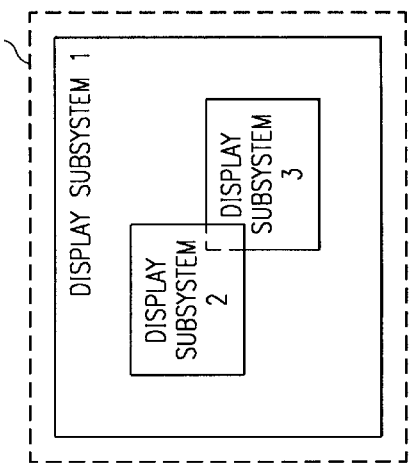

CIRCUITS, SYSTEMS AND METHODS FOR MEMORY MAPPING AND DISPLAY CONTROL SYSTEMS USING THE SAME

CROSS-REFERENCE TO RELATED APPLICATION

This is a Divisional of application Ser. No. 08/534,279, filed Sep. 27, 1995 now U.S. Pat. No. 6,025,840.

TECHNICAL FIELD OF THE INVENTION

The present invention relates in general to information processing systems and in particular to display mapping circuits, systems and methods and display control systems using the same.

BACKGROUND OF THE INVENTION

A typical processing system with video/graphics display capability includes a central processing unit (CPU), a display controller coupled with the CPU by a CPU bus, a system memory also coupled to the CPU bus, a frame buffer coupled to the display controller by a local bus, peripheral circuitry (e.g., clock drivers and signal converters), display driver circuitry, and a display unit. Additionally, the system may include peripheral controllers, such as those necessary to control a CD ROM drive, hard-disk drive, floppy disk drive, printer, to name a few.

The CPU generally provides overall system control and, in response to user commands and program instructions retrieved from the system memory, controls the contents of graphics images to be displayed on the display unit. The display controller, which may for example be a video graphics architecture (VGA) controller, generally interfaces the CPU and the display driver circuitry, controls exchanges of graphics and/or video data with the frame buffer during display update and refresh operations, controls frame buffer memory operations, and performs additional processing on the subject graphics or video data, such as color expansion.

The frame buffer stores words of graphics or video data defining the color/gray-shade of each pixel of an entire display frame during processing operations such as filtering or drawing images. During display refresh, this "pixel data" is retrieved out of the frame buffer by the display controller pixel by pixel as the corresponding display pixels on the display screen are generated. The display driver circuitry converts digital data received from the display controller into the analog levels required by the display unit to generate graphics/video display images. The display unit may be any type of device which presents images to the user conveying the information represented by the graphics/video data being processed. The "display" may also be a printer or other document view/print appliance.

In order for the CPU to communicate with a given subsystem or resource, for example the display controller, the system memory or one of the peripheral controllers, the CPU must be capable of individually addressing that subsystem. In currently available systems, the CPU primarily communicates with the subsystems through "glue" or "core" logic. The glue (core) logic is typically programmed to assign each subsystem a unique set of addresses in the CPU address space as a function of socket or board position. The core logic then routes requests for access to a selected subsystem via the expected socket. This technique is inflexible since subsystem function and the corresponding physical socket are inseparable. Thus for example, if a socket is assigned to maintain a memory module of a certain address space, it becomes impossible to insert therein a pin compatible module but whose function is that of a graphics controller.

One specific instance where communication between the CPU and the various subsystems is important is during display generation and update. This is particularly true in high speed/high resolution display systems, where it may be desirable to distribute the display data processing tasks. In this case, the CPU must be able to efficiently access each of the various processing resources as required to effect display updates and other display control functions. Once this is done, the subsystems can manage simple tasks such as display refresh while the CPU is available to attend to more critical tasks. Thus, the need has arisen for circuits, systems and methods for communicating with the various processing, control and memory resources in an information processing system. In particular, such circuits and systems and methods should be applicable to the control of the resources necessary to implement high definition/high speed display systems.

SUMMARY OF THE INVENTION

The principles of the present invention generally allow for a system master, such as a general purpose microprocessor, to map the address spaces of a plurality of subsystems. Among other things, these principles allow the master to assign each subsystem a unique addressing prefix allowing such subsystems to be independently addressed without regard for socket assignment or board position. Of particular advantage, a display system can be constructed in which multiple display controllers may be used to independently generate the images being displayed on respective regions of a display screen.

According to the first embodiment of the principles of the present invention, a display control system is provided which includes a system master, a system bus, and a plurality of display control subsystems coupled to said system bus, each of said display control subsystems controlling the display of images on a corresponding region of a display screen of an associated display device.

According to a second embodiment of the present invention, a processing system is provided which includes a system master, a system bus coupled to the master, and first and second bus interfaces. The first bus interface is coupled to the bus and has a mapping signal input coupled to the master and a mapping signal output. The first bus interface is operable to latch-in at least one first selected address bit presented by the master on the system bus in response to a mapping enable signal received at the mapping signal input from the master. The second bus interface is coupled to the bus and has a mapping signal input coupled to the mapping signal output of the first bus interface. The second bus interface is operable to latch-in at least one second selected address bit presented by the master on the bus in response to a second mapping enable signal received at the mapping input of the second bus interface from the first bus interface.

According to a third embodiment of the principles of the present invention, a processing system is provided which includes a system master, a system bus coupled to the master, and first and second subsystems. The first subsystem includes a first bus interface and a first processing resource, the first bus interface selectively coupled addresses and data presented on the bus to the first resource. The first bus interface also includes a mapping input coupled to the master and a mapping output. When mapping of the first subsystem is complete, the first bus interface is operable to latch-in an address prefix presented by the master on the system bus in response to a mapping enable signal received at the mapping signal input from the master. The first bus subsystem is also operable to output a mapping enable signal on the mapping output when mapping of the first subsystem is complete. The second subsystem includes a second bus interface and a second processing resource, the second bus interface coupling addresses and data presented on the bus to the second resource. The second subsystem also includes a mapping signal input coupled to the mapping signal output of the first bus interface. The second bus interface is operable to latch-in a second address prefix presented by the master on the bus in response to a second mapping enable signal received at the mapping input from the mapping output of the first bus interface.

The principles of the present invention are also embodied in methods for address mapping in a system including a plurality of subsystems. An initial address is presented to a first one of the subsystems, the first address including at least one prefix bit. At least the prefix bit is latched into the first subsystem with a mapping control signal. Then, a second initial address is presented to a second one of the subsystems, the second address including at least one prefix bit differing from at the least one prefix bit of the first address. At least the second prefix bit is latched into the second subsystem with a second mapping control signal received from the first subsystem.

The principles of the present invention provide substantial advantages over the prior art. Among other things, a system master can map the addresses of one or more associated subsystems each having an address base of an unknown size. Further, address mapping is no longer dependent on the socket/board position assigned to such subsystems. Additionally, these principles allow a system to be constructed in which multiple display controllers and/or frame buffers are used to independently drive corresponding regions on a display screen. Such application may be particularly advantageous in the design and implementation of high speed/high resolution display systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is functional block diagram of a display processing system embodying the principles of the present invention;

FIGS. 2A and 2B are diagrams depicting the display screen of a display device under the control of a display control system embodying the principles of the present invention, such as the display system shown in FIG. 1; and FIG. 3 is a functional block diagram of a general information processing system embodying the principles of the present invention.

DETAILED DESCRIPTION OF THE INVENTION

The principles of the present invention and their advantages are best understood by referring to the illustrated embodiment depicted in FIGS. 1–3 of the drawings, in which like numbers designate like parts.

FIG. 1 is a high level functional block diagram of a portion of a processing system 100 controlling the display of graphics and/or video data according to the principles of the present invention. System 100 includes a host computer system or central processing unit 101, a CPU local bus 102 and a plurality of independent display control units (subsystems) 103. In FIG. 1, two display control units 103 are shown for illustration purposes, although the exact number of display control units 103 will vary from one to a large number, depending on the requirements of the specific implementation.

Each independent display control unit 103 includes a display controller 104, frame buffer 105 and bus interface 106. Preferably, each display control unit 103 is fabricated on a single integrated circuit chip, although this is not a requirement to practice the present invention. One architecture suitable for implementing at least display controller 104 and frame buffer 105 on a single chip is described in coassigned U.S. Pat. No. 5,473,573, application Ser. No. 08/239,608, filed May 9, 1994. A system memory system 108 is also coupled to bus 102 and includes a bus interface 106 along with one or more memory devices composing a system memory 107. System 100 further includes a digital to analog converter/color palette (look-up table) 109 and display device 110.

Host computer 101 is the "master" which controls the overall operation of system 100. Among other things, host computer 101 performs various data processing functions and determines the content of the graphics data to be displayed on display unit 107 in response to user commands and/or the execution of application software. Host computer 101 may be for example a general purpose microprocessor (CPU), such as an Intel Pentium class microprocessor or the like, a system controller, or stand-along computer system. Host computer 101 communicates with the remainder of system 100 via CPU local bus 102, which may be for example a special bus or general bus, and a line carrying a mapping control signal (MAP).

Display controllers 104 may be any one of a number of commercially available display controllers suitable for driving a selected type of display unit and/or display resolution. For example, display controller 104 may be VGA controller, an LCD controller or a plasma display controller. Display controller 104 receives data, instructions and addresses from host computer 101 across bus 102. Generally, each display controller 104 controls screen refresh, executes a limited number of graphics functions such as line draws, polygon fills, color space conversion, display data interpolation and zooming, and video streaming and handles other ministerial chores such as power management.

Except as discussed below, system memory system 108 performs as a traditional system memory. Among other things, system memory 107 is used to store applications programs and other data and instructions required by host 101 during the execution of various processing functions. System memory 107 is preferably constructed from dynamic random access memory devices (DRAMS) but may also be constructed, either in whole or in part, static random access memory devices (SRAMs). System memory 107 may also include off-processor (L2) cache memory.

Digital to analog converter/pallete (display driver) 109 receives digital data from controller 104 and outputs the analog data to drive display 110 in response. Depending on the specific implementation of system 100, DAC 106 may also include YUV to RGB format conversion circuitry, and/or X- and Y-zooming circuitry, to name a few options. Display 110 may be for example a CRT unit, a liquid crystal display, electroluminescent display, plasma display, or other type of display device which displays images on a screen as a plurality of pixels. It should also be noted that in alternate embodiments, "display" 110 may be another type of output device such as a laser printer or similar document view/print appliance.

According to the principles of the present invention each display control unit 103 may each be assigned the responsibility for the control of display data of a respective region of the screen of display device 110. In FIG. 2A, the display screen has been divided into twelve (12) non-overlapping regions. In this case, system 100 would include twelve (12) display units (subsystems) 103, one each for each of the twelve screen regions. The number of screen regions and correspondingly the number of display control units (devices) 103 will vary from application to application, depending on such factors as desired display resolution, display screen size, and desired display generation speed, among other things.

Each bus interface 106 includes programmable prefix registers for holding one or more address bits (prefix bits) for uniquely identifying the corresponding unit 103. For discussion purposes assume that each subsystem 103/108 has an address space associated with a set of addresses. The number and length of the addresses required to sufficiently address a given subsystem will vary depending on the size of the address space of that subsystem. In the preferred embodiment, each address includes one or more higher order address bits ("prefix bits") which are used to uniquely identify and address the individual subsystems 103/108. The remaining lower order address bits are used to specifically address locations/resources internal to the subsystems themselves, such as specific locations within system memory 107 and selected frame buffer 105. The number and order of prefix bits will depend not only on the address spaces of the individual units 103 but also on the entire address space of all the units 103 together. Programming these registers is discussed in detail below. Further, each bus interface 106 performs some of the traditional functions found in conventional core logic, under the direction of master 101, such as the exchange of data, addresses, and instructions between host 101 and the corresponding display controller 104 and various timing and control functions.

FIG. 2B illustrates a second application of the system shown in FIG. 1. In this case, multiple overlapping windows or regions of the display screen are each controlled by a display control unit 103. The windows may each represent graphics data, video data (including full motion video) or icons. For example, display unit 1 may be driving a graphics window, display unit 2 a video window, and display unit 3 one or more icons. As another example, display unit 1 may be generating the system window or desk top, display unit 2 a graphics window for a first application and display unit 3 a graphics window for a second application. Numerous other combinations are possible.

Display control task partitioning, such as that illustrated in FIGS. 2A and 2B provides substantial advantages over the prior art. Among other things, while the data in the frame buffer 105 of one selected unit 103 is being updated, the remaining units 103 can continue to raster out data and refresh their corresponding screen regions. With multiple display controllers, more pixels can be generated/refreshed than could typically be handled by a single controller. This advantage will allow for the construction of higher resolution and/or larger display screens. Further, multiple display controllers can typically operate faster than a single controller for a given display screen size/resolution.

A preferred method of mapping the subsystems 103/108 of system 100 according to the principles of the present invention can now be described in detail. Initially, host computer 101 clears the memory map in which display control units 103 and system memory system 108 reside. Specifically, within each subsystem 103/108 the one or more bit positions of the prefix registers within each bus interface 106 are cleared to zero. In the preferred embodiment, host computer 101 presents a logic zero map enable signal on its MAP_OUT line to initiate the clear operation. The first subsystem in the chain, subsystem 103a, then clears its prefix registers and propagates the logic zero through its respective MAP OUT port to the MAP IN port of the next subsystem (subsystem 103b). The logic zero is similarly passed through the chain and finally back to host computer 101 from the last subsystem in the chain (subsystem 108) as an acknowledgement that initialization is complete.

After initialization is complete, master 101 starts the mapping procedure by setting the MAP enable signal on its MAP OUT port to the active (logic high) state. The MAP OUT ports of all of the subsystems 103/108 remain in the inactive (logic low) state at this point. Master 101 then presents a predetermined reference address on bus 102. The reference address is preferably address 0, but could be any other value within the address space of master 101. Selected reference address bits are latched into the prefix register of bus interface 106 of display unit 103a. In the preferred embodiment, master 101 then starts incrementing from the reference address to generate a sequence of addresses on bus 102. The sequence continues until the end of the address space of unit 103a is reached. The end of the address space may be determined by performing a comparison in the corresponding bus interface 106 between the addresses presented on bus 102 by master 101 and a stop (final or highest) address value indicative of the last address in the address space of unit 103a. The stop address value will equal the initial address loaded into the register for the subsystem 103/108 plus a fixed value representing the size (number of addresses) of the address space of that subsystem. Unit 103a preferably returns an opcode or other signal to master 101 via the data lines of system bus 102 indicating that the end of the address space has been reached.

When the end of the address space of unit 103a is reached, an acknowledgement is transmitted to master 101 across bus 102. Master 101 stores the initial and final addresses to first subsystem 103a (for example in registers) and the prefix (high order) bits of the addresses being output from master 101 are incremented. It should be noted that these prefix bits are incremented even if the count of the lower order bits has not reach the point at which a prefix bit incrementation would naturally occur in the address sequence. With regards to the lower order bits, master 101 preferably returns to zero, although master 101 may maintain the lower order bits from their current value. Mapping of unit 103a is now complete.

In alternative embodiments, it is not necessary for master 101 to increment through the address space of a given subsystem 103/108 in order to determine the address space sizes and consequently increment the prefix. For example, a given subsystem in a given slot may have a known address space. In this case, the master 101 simply loads the prefix and initial lower order address bits into the current subsystem and jumps to the prefix and initial address for the next subsystem. Further, each subsystem 103 may have internally coded a value indicating the size of its address space. This value may be output on bus 102 upon receipt of the initial address to that subsystem. Master 101 can then add this value to the prefix and initial address of the current subsystem to obtain the prefix and initial address of the next subsystem in the chain. The calculated value can then be loaded into the registers of the appropriate bus interface 106.

Next, the MAP OUT port of display unit 103a is set to active and the map signal (MAP) transmitted to the second subsystem in the chain, in this case display unit 103b. The new prefix resulting from prefix incrementation is latched into the corresponding bus interface 106 along with initial lower order address bits as the initial address for unit 103b. Latching preferably occurs with the rising edge of the map signal received at the MAP IN port of unit 103b. Master 101 increments as was done above, except from the new starting address. Master 101 continues to sequence through addresses until the last address in the address space of display unit 103b has been identified, as discussed above. Master 101 stores information identifying the initial and final lower order addresses to subsystem 103b and the address prefix is again incremented. Then, MAP OUT port of display unit 103b is then set active (high). The new prefix bits along with initial lower order address bits are latched into the registers of the next subsystem in the chain with the rising edge of the active mapping enable signal presented at the output of the MAP OUT port of display unit 103b.

The mapping procedure described above continues in a similar fashion until all the subsystems 103/108 have been mapped (i.e a prefix value uniquely identifying each subsystem 103/108 has been stored in the registers of the corresponding bus interface 106). In the illustrated system, the mapping proceeds through each of the display units 103 and the system memory system 108. At the conclusion of the mapping of the last subsystem in the chain (e.g. system memory system 108), the MAP OUT port of that subsystem goes active thereby signalling master 101 that mapping is complete.

It should be recognized that the address space of a particular subsystem may not require all the lower order address bits between incrementations of the prefix bits. In this case, master 101 can select a subset of lower address bits within the set of address bits associated with a value of the higher order address bits of the prefix. The master 101 may do such a selection, for example, to optimize use of its own address space. Further, two or more subsystems could be assigned a unique subset of the lower order address bits associated with a single prefix. In this case, the prefix bits would not be incremented at the transition between the address space of one system and that of another.

During normal operation, to access a given subsystem 103/106, host computer 101 transmits an address on bus 102 which includes prefix bits identifying the target subsystem 103/108 and lower order bits identifying a location or resource within the subsystem 106/108. Each bus interface unit 106 compares the prefix of the address with the prefixes stored in its prefix registers. When a match occurs, the entire address is input and/or latched-in by the bus interface 106 storing the matching prefix bits for processing by the corresponding subsystem 103/108. This comparison may be implemented in any number of ways, for example by an array of exclusive-OR gates.

The principles of the present invention are not limited to display control systems, such as system 100. A more generalized embodiment is shown in FIG. 3. System 3 includes a master 301 which may be for example a general purpose microcontroller, a controller, computer system, to name of few examples. Master 301 according to the principles of the present invention is configured to propagate the mapping signal MAP and generate the prefixes and local (low order) addresses required to implement the memory mapping procedure discussed above.

System 300 further includes a plurality of subsystems or units 302 under the general control of master 301. Each subsystem 302 includes a bus interface 303 and resource 304. For a given subsystem 302, bus interface 303 and resource 304 may be fabricated together on a single chip or may each comprise one or more discrete chips. Each bus interface 303 operates in accordance with the mapping principles of the present invention discussed above. Further, a given bus interface 303 may also provide an interface for delivering data and addresses to peripheral devices, depending on the type of the associated resource 304. A given resource 304 may be for example a memory device (e.g. system memory, cache memory, or a frame buffer), a display controller, bus bridge, hard drive controller, clock generator, floppy drive controller, coprocessor, to name a few possibilities.

The principles of the present invention provide substantial advantages over the prior art. Among other things, the system master can map the addresses of one or more subsystems each having an address space of an unknown size. Further, address mapping is no longer dependent on the socket/board position of the subsystems. Additionally, a system can be implemented in which multiple display controllers and/or frame buffers are used to independently drive corresponding regions on a display screen. One particularly advantageous application of the principles of the present invention is in high speed/high resolution display systems.

Although the present invention and its advantages have been described in detail, it should be understood that various changes, substitutions and alterations can be made herein without departing from the spirit and scope of the invention as defined by the appended claims.

What is claimed is:

1. A processing system comprising:

a system master;

a system bus coupled to said master;

a first bus interface coupled to said bus and having a mapping signal input coupled to said master and a mapping signal output, said first bus interface operable to latch-in a sequence of selected addresses presented by said master on said system bus in response to a mapping enable signal received at said mapping signal input from said master and compare each said address of said sequence and in response output a second mapping enable signal on said mapping signal output indicating a last said address in an address space has been reached and said mapping of said first bus interface is complete; and a second bus interface coupled to said bus and having a mapping signal input coupled to said mapping signal output of said first bus interface, said second bus interface operable to latch-in at least one second selected address bit presented by said master on said bus in response to said second mapping enable signal received at said mapping input of said second bus interface from said first bus interface.

2. The system of claim 1 wherein said first bus interface further operable to:
  compare said first selected bit latched-in to said first bus interface with a corresponding bit of an address subsequently presented on said system bus; and
  input said subsequently presented address when said selected address bit latched-in to said first bus interface matches said corresponding bit of said presented address.

3. The system of claim 2 wherein said master is further operable to generate said second selected bit by incrementing from said first selected bit and said first bus interface is further operable to present a second mapping enable signal to said second bus interface, upon completion of address mapping of said first bus interface.

4. The system of claim 3 wherein said at least one first selected bit comprises a higher order address bit.

5. The system of claim 3 wherein said at least one second selected bit comprises a higher order address bit.

6. The system of claim 1 wherein said second bus interface further operable to:
  compare said second selected bit latched-in to said second bus interface with a corresponding bit of an address subsequently presented on said system bus; and
  input said subsequently presented address when said selected address bit latched-in to said second bus interface matches said corresponding bit of said presented address.

7. A processing system comprising:
  a system master;
  a system bus coupled to said master;
  a first subsystem including a first bus interface and a first processing resource, said first bus interface selectively coupling addresses and data presented on said bus to said first resource and having a mapping input coupled to said master and a mapping output, said first bus interface operable to latch-in an address prefix presented by said master on said system bus in response to a mapping enable signal received at said mapping signal input from said master and a sequence of associated address bits and to output a mapping enable signal on said mapping output when said sequence of address bits reaches a end of an address space of said first subsystem and mapping of said first subsystem is complete;
  a second subsystem including a second bus interface and a second processing resource, said second bus interface coupling addresses and data presented on said bus to said second resource and having a mapping signal input coupled to said mapping signal output of said first bus interface, said second bus interface operable to latch-in a second address prefix presented by said master on said bus in response to a second mapping enable signal received at said mapping input from said mapping output of said first bus interface.

8. The system of claim 7 wherein said master is operable to generate said second prefix by incrementing from said first prefix when mapping of said first subsystem is complete.

9. The system of claim 7 wherein said first subsystem transfers a signal to said master controller via said bus indicating mapping of said first subsystem if complete.

10. The system of claim 9 wherein said master is operable to present a sequence of addresses to said first bus interface via said bus and said first bus interface is operable to compare each said address of said sequence and in response output a signal to said master indicating a last said address in an address space has been reached and said mapping of said first bus interface is complete.

11. The system of claim 7 wherein said first and second resources each comprise a display controller for driving corresponding first and second regions of a display screen of an associated display device.

12. The system of claim 7 wherein at least one of said first and second resources comprises a memory.

13. A method of address mapping in a system including a plurality of subsystems, the method comprising the steps of:
  presenting a first initial address to a first one of the subsystems, the first address including at least one prefix bit;
  latching at least the prefix bit into the first subsystem with a mapping control signal;
  presenting a sequence of address to the first subsystem;
  comparing each address in the sequence with a fixed value stored within the first subsystem to determine the last address in the address space of the first subsystem;
  incrementing from the first prefix bit to generate the second prefix bit;
  generating the second mapping control signal;
  presenting a second initial address to a second one of the subsystems, the second address including at least one prefix bit differing from said at least one prefix bit of said first address; and
  latching at least the second prefix bit into the second subsystem with a second mapping control signal received from the first subsystem.

14. The method of claim 13 and further comprising the steps of:
  determining a last address in an address space of the first subsystem;
  incrementing from the first prefix bit to generate the second prefix bit; and
  generating the second mapping control signal.

15. The method of claim 14 wherein said step of determining the last address in the address space of the first subsystem comprises the substeps of:
  presenting a sequence of address to the first subsystem;
  comparing each address in the sequence with a fixed value stored within the first subsystem to determine the last address in the address space of the first subsystem.

* * * * *